United States Patent Office 3,551,174
Patented Dec. 29, 1970

3,551,174
WATER-DISPERSIBLE ALUMINUM PASTES AND POWDERS, AND PROCESS FOR MAKING
Miklos Hauska, Mihaly Schutz, and Ferenc Kontra, Budapest, Hungary, assignors to Chemolimpex Magyar Vegyiaru Kulkereskedelmi Vallalat, Budapest, Hungary, a firm
No Drawing. Filed Sept. 25, 1967, Ser. No. 670,454
Int. Cl. C04b 21/00, 31/44
U.S. Cl. 106—314                                      8 Claims

ABSTRACT OF THE DISCLOSURE

Aluminum powder and aluminum paste are provided, characterized by improved dispersibility in water, extended shelf life with no deterioration and without danger of explosion or fire during manufacture, storage or use. These materials are used generally where, as a result of reaction of the aluminum with alkaline or acidic media, the resulting gas formation is utilized as a blowing agent, e.g. in the manufacture of foamed concrete. In accordance with the present process and acidic anionic wetting agent reactive with ground aluminum, is used during the milling thereof in an organic solvent, then the excess wetting agent is washed out and the desired solids concentration of the resulting mass is adjusted. If aluminum powder is to be made, the adjusting of the solids concentration includes evaporation of the organic solvent. When an aluminum paste is desired, a substantially neutral pH wetting agent suitable for creating an aqueous emulsion of organic solvents and having no substantial anionic or cationic activity, is added to the adjusted mass to obtain thereby the paste product.

---

The present invention relates to a method for preparing aluminum paste or powder, more particularly the present invention relates to improved water-dispersible aluminum paste or powder, which is particularly useful in chemical reactions in aqueous media, accompanied by hydrogen formation.

Aluminum powder is generally used in reactions accompanied by gas formation, most often in the preparation of porous cementitious products, such as foamed concrete, porous mortar and stucco, and also in the preparation of plastic foams, generally where the gas is formed as a consequence of reaction between aluminum and acidic or alkaline media. It is a basic requirement in such applications that the surface of the aluminum powder should be easily wettable for good dispersion and, at the same time, the aluminum powder product should have good shelf life, i.e. capable of being stored for sufficient periods of time without oxidation and resultant loss in the amount of the effective metal.

A number of processes are known in the prior art for the preparation of water-dispersible aluminum pigment pastes or powders. According to one known process a paste is prepared by milling with organic solvents, and then an alkaline or neutral emulsifier is added to partly emulsify the organic solvent in the water to be added to the paste before use, and in part to saponify and remove the fatty acids deposited on the surface of the aluminum particles. A serious drawback of this prior art process is that the alkaline emulsifier shortens the period of useful shelf life of the aluminum paste, because it reacts with the aluminum during prolonged storage. It has been suggested to use neutral emulsifiers to preclude its reaction with the aluminum, however, these remove the fatty acid only very slowly from the surface of the aluminum powder and retard the gas-forming reaction when the aluminum is incorporated in a host medium for use as a blowing agent.

According to another known method aluminum paste is dispersed in an organic medium and then is ground in an aqueous medium in the presence of inhibitors to protect the surface of the aluminum particles against chemical attack during storage. The most commonly used inhibitors include phosphates, borates, saccharides, and the like. It is a common drawback of shelf life stabilizers that their activity to inhibit the reactivity of the aluminum particles desirably during storage, manifest itself at the time of intended use when such inhibition is undesired, furthermore they often detrimentally influence desirable properties of the host medium and retard commencement of the reaction that is to take place during intended use of the metal particles.

In accordance with yet another known process two alternative avenues can be used: (a) the aluminum starting material is ground in a dry state, with only a fatty acid being present, or (b) the aluminum starting material is ground in a solvent and is subsequently dried. The drawback of the first alternative is that it presents fire and explosion hazard, because of the pyrophoric character of aluminum powder and also, because of the tendency for explosion of the end product during its heat treatment, even under vacuum, to remove the fatty acid and to recover the water-dispersible powder. When the second alternative is employed, it is necessary to remove the fatty acid from the aluminum paste and this is also a similarly dangerous procedure.

Aluminum powder gradually deteriorates by oxydation during storage, especially when stored without fatty acid, and thus the amount of available active metal is diminished.

It is exactly because of the aforementioned drawbacks that the first two of the above-mentioned prior art methods for making aluminum powders or pastes have generally not been employed, and in one of the most important fields of application, in the manufacture of foamed concrete, dry aluminum pigments are used by the prior art, which, as outlined in connection with the last one of the above-mentioned prior art processes, is attended by substantial risks and hazards during manufacture and use.

It is an object of the invention to provide a method and composition made thereby, for producing aluminum paste or powder having improved activity, dispersibility, and shelf life, and being free of the drawbacks of the prior art processes.

Accordingly, there is provided in a process for producing aluminum powder or aluminum paste, wherein the aluminum starting material is ground in an organic solvent, the improvement which comprises conducting said grinding in up to 3% by weight, based on the starting material, of at least one acidic anionic wetting agent which is reactive with freshly ground aluminium, removing the excess of said wetting agent from the material treated therewith by the washing thereof, and adjusting the desired solids concentration of the resulting mass. When an aluminum powder is to be made, said adjusting comprises evaporating the organic solvent preferably at reduced pressure, and recovering the aluminum powder. When an aluminum paste is intended to be made, there is added to the adjusted mass 1–6% by weight, based on the mass, of an oil-soluble nonionic or ampholytic wetting agent of substantially neutral pH and being suitable for creating an aqueous emulsion of organic solvents, and recovering the paste.

As the acidic anionic wetting agent, the acidity of which is caused by free acid groups, there can be advantageously used at least one of sulfated fatty acids or fatty alcohols, alkyl-, aryl-, or -aralkyl-sulfonates, alkane sulfonates or polysulfonates or polysulfonates linked with ester-, or -amide-radicals, and the condensates thereof with ethylene oxide or propylene oxide.

Some examples of the wetting agents which do not have marked ionic activity include, for example at least one of: polyethers of alkyl phenols and of fatty alcohols, esters of fatty acids formed with ethylene glycol and propylene glycol, amides derived from alkylolamines, as well as condensates of the above-mentioned products with ethylene oxide or propylene oxide. Generally those nonionic emulsifiers have been found to be particularly suitable, which reduce the surface tension of water at 20° C. to at least 30 dynes/cm.

The present invention is, in part, based on the recognition that anionic wetting agents containing free acid groups will enter into reaction to form salts with newly formed surface of aluminum, as is produced by grinding in an organic solvent; such surfaces having an increased tendency to enter into chemical rections. By adding to the starting slurry composed of the aluminum starting material in the conventional organic medium, an anionic wetting agent having free acid groups, and in an amount which is in excess of that which would correspond to the surface of the metal, and then grinding the aluminum powder in this composite slurry, a chemical reaction takes place as a result of which a monomolecular compound is formed on the surface of the aluminum particles. This layer manifests surface-active characteristics, prevents oxidation of the underlying surface of the aluminum particle and thereby preserves the metal in its fully active form. At the same time, the reactivity of the resulting product is enhanced and enables the use of aluminum pastes or powders in such areas of use where aluminum pigment pastes or powders such as those of the prior art processes referred to hereinabove, have heretofore not been employed to a significant extent.

It is one of the advantages of the products of the present invention, over aluminum powders made by preparation only in the presence of a fatty acid and otherwise under dry conditions that in the process of the present invention there is no special danger of fire or explosion as is the case with the aforementioned prior art processes. The products of the present invention do not oxidize during storage, and there is no loss in the amount of available active metal. The bulk density of pastes of the present invention is at about 1.4 g./m., therefore, it is easier to handle during shipping, etc., and requires less attention than is the case with pigments having small bulk density (e.g. 0.15 g./cm.$^3$).

Further advantages of the products of the present invention manifest themselves during their use. The inventive products can be usually dispersed in water, such as even by manual stirring. The dispersion appears to be stable at any dilution. The surface active layer formed on the aluminum particles in accordance with the present invention makes the metal surface readily wettable and thereby also hastens commencement of the desired reaction during use. The rate of gas formation can be controlled by adjusting the pH of the aqueous medium, as well as by controlling the temperature.

In carrying out the process of the present invention, mineral spirits have been found particularly suitable as the organic solvent used during the grinding of the aluminum powder starting material, however, a large number of other organic solvents, including aromatics, esters, ethers, ketones and alcohols, can also be used with good results. Grinding can be carried out in any suitable manner, such as in ordinary ball mills. After grinding is completed, the resulting mud can either be diluted with an organic solvent, such as the same type as was used for grinding. The suspension is then removed from the grinding apparatus, and its solids content can be adjusted, possibly after washing with an organic solvent, by centrifuging, in filter presses, and the like. The filtrate can be recirculated for reuse. When the manufacture of aluminum powders is desired, there is no further surfactant added to the presscake recovered from a filter press or centrifuge, and any residual amounts of solvent can be removed, such as by vacuum distillation.

The present invention is illustrated in detail in the following illustrative examples which set forth the best mode contemplated for carrying out the present invention which is not related to all details of these examples.

EXAMPLE 1

A mixture of 100 kg. coarsely ground aluminum leaflets, 100 kg. mineral spirits, and of 2 kg. oxyethylenated fatty alcohol sulfonic acid, is ground in a ball mill for about 8 hours, then further diluted by 200 kg. mineral spirits, and subsequently treated in a filter press until the resulting presscake has a solids content of about 80% by weight.

Aluminum paste is prepared from this presscake by adding 19 kg. petroleum spirits, and 4 kg. isotridecanol polyglycol ether to each 100 kg. presscake. This composition is mixed for approximately 30 minutes, and yields a paste which is ready for use and has good shelf like characteristics.

Aluminum powder is made from the presscake which contains about 80% by weight solids, by distilling the residual solvent off under vacuum in a tray-equipped drying column. After the dry product cools to ambient temperature, it is strained through a screen having openings of about 250 microns.

EXAMPLE 2

Presscake is prepared from a mixture of 100 kg. atomized aluminum powder, 100 kg. xylene, and 2 kg. dodecylbenzenesulfonic acid. A paste is prepared by adding 17 kg. xylene, and 6 kg. of a nonionic fatty acid polyglycolester surfactant, to each 100 kg. presscake. The preparation of the powder can be accomplished as disclosed in Example 1.

EXAMPLE 3

A presscake is prepared by the steps of Example 1, from a starting mixture of 100 kg. of coarsely ground aluminum leaflets, 100 kg. mineral spirits, and 2 kg. of an alkaryl sulfonate. Aluminum paste is prepared from the presscake by the steps of Example 1, by using 10 kg. mineral spirits and 4 kg. of an alkylphenol polyglycolether.

We claim:
1. In a process for preparing an aluminum paste or powder, wherein the aluminum starting material is ground in the presence of an organic solvent, the improvement which comprises in said grinding being carried out in the further presence of 2 to 3% by weight based on the aluminum starting material of an acidic anionic wetting agent reactive with freshly ground aluminum, said agent being a member of the group consisting of sulfated fatty acids, sulfated fatty alcohols, alkyl sulfonates, aryl sulfonates, aralkyl sulfonates, alkane sulfonates or polysulfonates linked with at least one ester group or an amide group, and the condensates of at least one of the aforesaid members with at least one of ethylene oxide and propylene oxide, and washing the ground aluminum with additional organic solvent to remove any unreacted acidic anionic wetting agent therefrom.

2. The improvement in the process of claim 1, further comprising the step of separating aluminum powder from the solvent in the washed aluminum mass.

3. The improvement in the process of claim 1, further comprising the steps of adjusting the solids content of the washed aluminum mass, adding to the solids an organic solvent and from about 1% to about 6% by weight based on the mass of adjusted solids of an oil-soluble nonionic or ampholytic substantially neutral pH wetting agent suitable to create an aqueous emulsion with the organic solvent, and recovering the resulting paste.

4. The improvement in the process of claim 3, wherein said nonionic or ampholytic wetting agent comprises at least one of the following compounds: at least one of polyethers of alkyl phenols and of fatty alcohols, esters of fatty acids formed with at least one of ethylene glycol and propylene glycol, amides derived from alkylolamines, and condensates of at least one of said compounds with at least one of ethylene oxide and propylene oxide.

5. The improvement in the process of claim 3, wherein said step of adjusting the solids content of the washed aluminum mass comprises compressing the mass in a filter press.

6. The improvement in the process of claim 3, wherein said step of adjusting the solids content of the washed aluminum mass comprises centrifuging the mass in a filter press.

7. The product of the process of claim 2.

8. The product of the process of claim 3.

References Cited

UNITED STATES PATENTS

| 3,442,672 | 5/1969 | Kampf | 106—314 |
| 3,386,844 | 6/1968 | Rolles et al. | 106—291 |
| 3,197,323 | 7/1965 | Rehmar | 106—87 |

OTHER REFERENCES

Reynolds Metals Co., "Aluminum Powders and Pastes," 1957.

TOBIAS E. LEVOW, Primary Examiner

W. T. SCOTT, Assistant Examiner

U.S. Cl. X.R.

106—86, 87, 290; 241—16